Sept. 14, 1948.  R. GUNN  2,449,068
ELECTRIC FIELD OR POTENTIAL INDICATOR
Filed Aug. 28, 1944
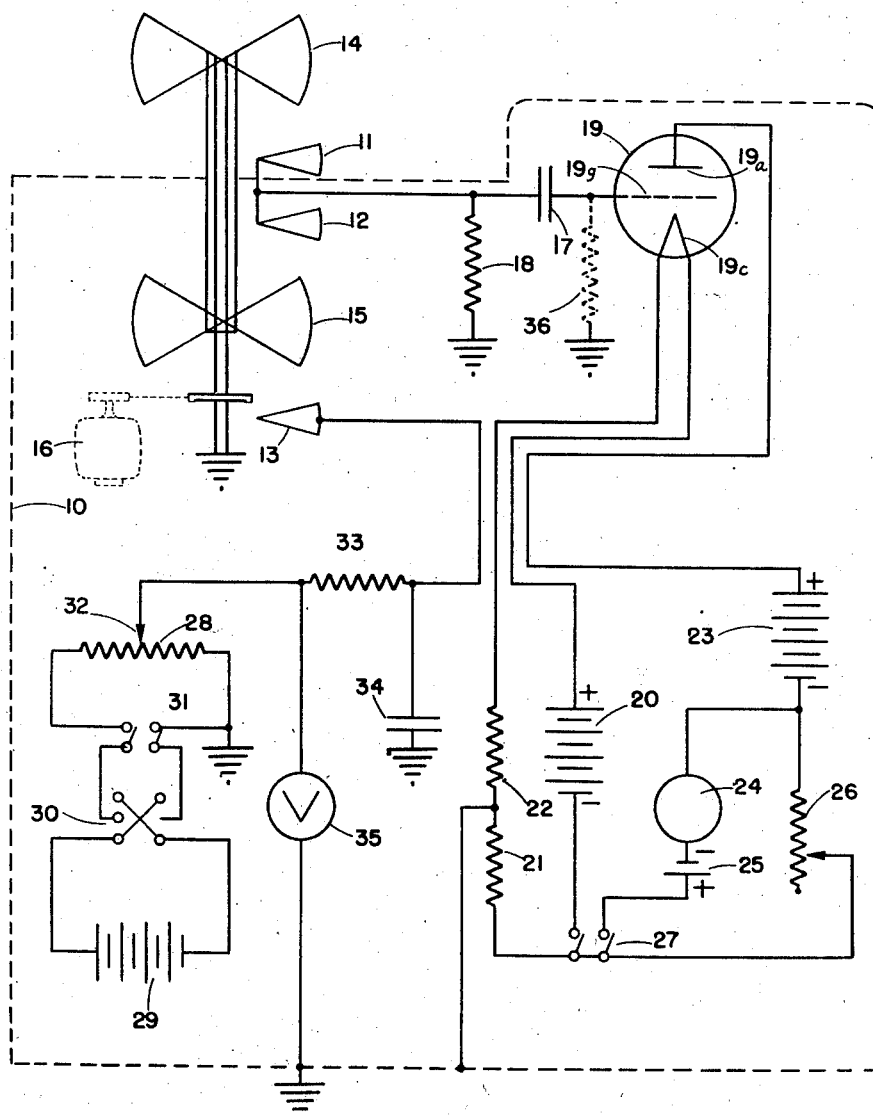
Inventor
ROSS GUNN
By W. Glenn Jones
Attorney Patented Sept. 14, 1948

2,449,068

UNITED STATES PATENT OFFICE 2,449,068

ELECTRIC FIELD OR POTENTIAL INDICATOR

Ross Gunn, Washington, D. C.

Application August 28, 1944, Serial No. 551,595

8 Claims. (Cl. 171—95)

(Granted under the act of March 3, 1883, as amended April 30, 1928; 370 O. G. 757)

My invention relates to electric field intensity measurement and more particularly to an apparatus for measuring electric field intensities and potential gradients.

It is commonly appreciated among scientists that it is almost impossible to measure a quantity of energy without using or losing some of it. For example, in precise thermal measurements the heat capacity of the apparatus and thermometer must be appreciated and taken into account. In precise electric power measurements, the amount of power required to activate the wattmeter is often significant. Generally, the smaller the quantity being measured, the less loss can be tolerated in the measuring apparatus.

Appreciation of this general rule has led to the development of a variety of "null" type measurements in electrical and physical sciences. The most common of these is exemplified by the Wheatstone bridge and its multitude of variations.

Electric field intensity and potential gradient measurements often call for the measurement of quantities so small that for best precision only an infinitesimal quantity of energy can be spared to activate the measuring apparatus. It is also well known that the insertion of even the smallest probe into an electric field will often upset its symmetry so badly if an appreciable amount of energy is withdrawn that the measurement will be worthless. Consequently in precision measurements elaborate precautions are adopted by shielding apparatus, taking only a negligible amount of energy and amplifying it to an observable signal.

It is an object of my invention to provide apparatus for making a true "null" measurement of electric field intensity or potential gradient.

It is a second object of my invention to make possible not only the measurement of the field intensity but also its direction or polarity.

It is a third object of my invention to make possible the comparison of any unknown field intensity with any preselected field intensity that is easy to determine by use of a simple voltmeter.

It is a fourth object of my invention to provide apparatus with electronic indicating means in a manner such that the measurement will be independent of tube characteristics over a wide range of field intensities.

Other objects and advantages of my invention will appear from the following detailed description and drawing accompanying this specification.

Accordingly my invention resides in an apparatus for measuring static charges, potential differences or electric field intensities by creating a periodically varying electrical signal by alternately shielding and exposing an electrode to the field or charge being measured, and comparing the field adjacent the electrode with an oppositely oriented field by using the resultant electrical signal created as an indicator.

The construction of my novel apparatus, the relationship of the various parts and the principle of operation can be understood by reference to the drawing which is a simplified diagram of the circuit and apparatus.

In the drawing, 10 represents an electrostatic shield enclosing most of the circuit parts. An electrode 11 is exposed to the field to be measured and is highly insulated to prevent loss of charge therefrom. A second electrode 12 is electrically connected to electrode 11 but enclosed within the shield 10. A third electrode 13 within shield 10 is positioned opposite from second electrode 12. The reason for showing the electrodes as they appear in the drawing will appear hereinafter.

Grounded electrode 14 is positioned outside the shield 10 and within the field of influence of electrode 11 in such a way that 14 can be periodically interposed between 11 and influencing charges or electric fields outside. Similarly, grounded electrode 15 is positioned within the shield 10 and within the field of influence of electrode 12. Both 14 and 15 are rotatably mounted and a driving means such as motor 16 can be provided to rotate the electrodes 14 and 15 so that electrode 11 is alternately exposed and shielded from the field outside the shield 10 when electrode 14 is rotated. Driving means 16 is shown in dotted lines, for, as will be pointed out subsequently, it may or may not be necessary depending upon the purpose for which the apparatus is to be used. Likewise inside the shield by rotation of electrode 15, electrode 12 is alternately exposed to and shielded from the field set up by electrode 13 as a result of a voltage applied thereto. Electrodes 14 and 15 are so arranged that exposure and shielding of electrodes 11 and 12 occur in phase.

Electrodes 11 and 12 are coupled to the grid of tube 19 through capacitance 17 and impedance 18. Impedance 18 is ordinarily a resistor having a high value such as a thousand megohms ($10^9$ ohms). Tube 19 shown as a triode, having anode 19a, cathode 19c and grid 19g, could be a tetrode or other multi-grid tube. The tube used should preferably be a tube having a high input impedance, low input capacity and low internal resistance. The cathode may be either directly or indirectly heated.

The cathode 19c of the tube is heated by means of a battery 20 through resistors 21 and 22 which reduce the voltage to that for which the cathode is rated. By grounding a selected point between resistors 21 and 22 the cathode 19c can be held at a selected potential above ground. This is generally desirable to counteract the effects of potential drop set up between anode 19a and cathode 19c as a result of thermal agitation. The output circuit of tube 19 comprises a battery 23 supplying positive potential to plate 19a, a current indicating device such as microammeter 24 in series with a small source of potential 25 and shunted by variable impedance 26. The function of potential source 25 is to facilitate the setting of the zero on the microammeter 24 which oftentimes would show an inconvenient residual reading without it. The circuits are closed by means of a switch 27.

A potentiometer comprising an impedance 28 grounded at one end and a source of relatively high potential 29 connected across impedance 28 through suitable on-off and reversing switches 30 and 31 is connected to electrode 13 through a variable contact 32 and a high impedance 33. For smoothest operation, electrode 13 is connected to ground through capacitance 34 so that its potential will remain substantially constant during rotation of shielding member 15. Capacitance 34 must be of a size to bypass to ground the periodic fluctuations of voltage created by rotation of shielding member 15 without an appreciable voltage drop across resistor 33. A voltmeter 35 is placed between the end of resistor 33 and ground.

In operation, it is well to permit microammeter 24 to read about half scale for a zero or quiescent reading. This is adjusted by varying the values of impedance 26 and battery 25. In this manner irregularities in the lower part of the meter scale can be avoided. Electrodes 11 and 12 are then adjusted to be at ground potential. Electrodes 14 and 15 are then rotated rapidly in synchronism with the result that a pulsating potential is developed across impedance 18 which is proportional to the electrostatic field surrounding electrode 11. This potential is transmitted to grid 19g of tube 19 through coupling capacitance 17. Since the tube 19 at its quiescent state is kept near cutoff, increase in plate current for a positive grid excursion is greater than the decrease in plate current for an equal but negative grid excursion. Thus the average current indicated by the meter 24 increases when electrodes 14 and 15 are rotated.

The measurement of the intensity of the electrostatic field surrounding the electrode 11 is accomplished by applying to electrode 13 by means of the potentiometer arrangement 28, 29, 30, 31 and 32 a potential of polarity opposite to that being measured and to which electrode 11 is exposed until meter 24 returns to its zero or quiescent reading. At this point the potential indicated by the voltmeter 35 gives a measure of the intensity of the electrostatic field surrounding electrode 11. Since the distance between electrodes 12 and 13 is known, the potential gradient of the field can be computed.

The general applicability of the apparatus herein described to field intensity measurements is clear. In stationary or laboratory applications, some motive power would have to be used to rotate electrodes 14 and 15 and this is indicated in the drawing as motor 16. In other applications, such as its use in aircraft to measure the electrical state of the atmosphere, electrodes 14 and 11 would be placed in the slip stream of the aircraft and no motive power would be necessary to rotate electrode 14. Since electrodes 14 and 15 can be put on the same shaft, their rotation in phase would thus be accomplished. Thus it is apparent that electrodes 11, 12, 13, 14 and 15 are represented semi-pictorially for when the apparatus is mounted in an aircraft and electrodes 11 and 14 are outside of and close to the fuselage of the aircraft the plane of rotation being parallel to the fuselage the form in which 14 will rotate most effectively is naturally like that of the fan blade.

In my United States Patent 1,919,215, issued July 25, 1933, I described apparatus well adapted to use in measuring the electrical state of the atmosphere surrounding aircraft in flight. In that patent I described several schemes for obtaining electrical signals from the atmosphere and for synchronous rectification of the same, all of which could be used in the apparatus described in this application.

It is well to point out at this point that impedance 18 is not absolutely necessary for the successful operation of the apparatus as might be guessed from the typical size ($10^9$ ohms) mentioned above. Grid 19g always tends to return to its normal potential regardless of the collection of electrons thereon. Apparently it picks up a few positive ions at some time during operation. It is quite possible for it to do so since the grid current flowing is probably of the order of a millimicroampere under maximum conditions.

In the drawing, resistor 36, shown in dotted lines between the grid 19g and ground, represents the input impedance of the tube which is generally quite high. If an apparatus of very high stability is desired, an actual physical resistor can be inserted between grid and ground in the place where input impedance 36 of the tube is now shown.

The theory of operation of my device is readily summarized as follows: If a free charge is present in space, it will induce an opposite charge on a conductor exposed in a manner such that the conductor can see the said free charge. If the conductor is then shielded from the free charge by a grounded conductor, the charge induced on the first conductor by the free charge will disappear by flowing to ground. If the exposed conductor is periodically exposed to the free charge and shielded therefrom, it is seen that a pulsating signal will flow to ground. This pulsating signal can be used to measure the magnitude of the free charge. In the apparatus I have described, the various components can have identified with them functions such as I have described in this paragraph. For example, in the drawing 11 is the electrode exposed to a charge which it "sees" somewhere outside of the shield 10. Electrode 14 alternately shields and exposes 11 to the free charge. The pulsating signal obtained is applied to the tube 19 by way of resistor 18 and capacitor 17.

The above discussion applies also to electrodes 12, 13 and 15. Electrode 12 is exposed to the charge on electrode 13. Electrode 15 does the shielding. It can be seen that by properly orienting the potential applied to electrode 13 a condition can be reached such that the field within the shield 10 is exactly equal and opposite to that outside of shield 10 with the result that no signal will be impressed upon grid 19g. In this manner an unknown field intensity can be compared with a known value.

Since certain changes in carrying out this method of field strength measurement and in the construction and arrangement of apparatus set forth which embody the invention, can be made without departing from its scope, it is intended that all matter contained in the above description or shown in the accompanying drawing shall be interpreted as illustrative and not in a limiting sense. It is also to be understood that the following claims are intended to cover all the generic and specific features of the invention herein described, and all statements of the scope of the invention, which as a matter of language, might be said to fall therebetween.

The invention described herein may be manufactured and used by or for the Government of the United States of America for governmental purposes without the payment of any royalties thereon or therefor.

Having described my invention, what I claim as new and desire to secure by Letters Patent is:

1. Apparatus for measuring electric field intensity comprising means for duplicating within a shielded space the intensity of the field being measured, dynamic means for obtaining from the field being measured a first signal proportional to the field and a second signal proportional to the duplicating field, means operative to indicate a difference between the first and second signals, and means operative to indicate the intensity of the duplicating field.

2. Apparatus for measuring electric field intensity comprising a plurality of electrodes exposed to the field being measured at least one of which is movable and grounded, a plurality of shielded electrodes at least one of which is movable and grounded, means associated with at least one of said shielded electrodes for setting up a field controlled in magnitude and direction in opposition to that being measured means for moving the movable electrodes in synchronism within the fields of influence of the respective ungrounded electrodes to generate an electrical signal proportional to the difference between the two field strengths, and amplifying and indicating means for indicating the magnitude of said signal.

3. Apparatus for measuring field intensity and potential gradients comprising a plurality of spaced plates exposed to the field being measured at least one of which is rotatable and grounded, a plurality of spaced shielded plates at least one of which is rotatable and grounded, a second one of said shielded plates being associated with a potentiometer and means for reversing applied potential to said second plate, means for rotating said rotatable plates in phase periodically to shield said other plates, shielded electronic amplifying and indicating means electrically coupled to said other plates, indicating means to indicate the magnitude of the periodically varying electrical signal created by the intermittent shielding and exposure of the other plates, and means for determining the polarity and magnitude of the potential applied to the other shielded plate necessary to reduce the indication of the indicating means to its quiescent value.

4. Apparatus for measuring field intensity and potential gradients comprising a plurality of spaced plates exposed to the field being measured at least one of which is rotatable and grounded, a plurality of spaced shielded plates at least one of which is rotatable and grounded, a second one of said shielded plates being associated with a potentiometer and means for reversing applied potential to said second plate, said potentiometer being bypassed to ground by a capacitor which will pass rapid fluctuations of potential, means for rotating said rotatable plates in phase periodically to shield said other plates, shielded electronic amplifying and indicating means electrically coupled to said other plates, indicating means to indicate the magnitude of the periodically varying electrical signal created by the intermittent shielding and exposure of the other plates, and means for determining the polarity and magnitude of the potential applied to the ungrounded shielded plate necessary to reduce the indication of the indicating means to its quiescent value.

5. In a device for measuring electrostatic charges or potential differences which comprises means responsive to a first electrostatic field, dynamic means varying said field for deriving periodic current therefrom and means for indicating said current, the improvement which comprises in association with said dynamic periodic current-producing means a second means synchronously operative to establish a second dynamic electric field in opposition to the first and of sufficient magnitude to reduce the current indication to a predetermined value and thereby obtaining a measure of the intensity and direction of the first field.

6. A dynamic electrometer comprising field responsive electrode means, shielding means enclosing only a portion of the field responsive electrode means to leave an unexposed portion thereof, the exposed portion being responsive to an external field and the enclosed portion being responsive to a field within the shielding means, means operative to establish a controlled field within the shielding means, and means recurrently operative to shield both portions simultaneously of the field responsive electrode means from the external and controlled fields to generate a recurrent signal dependent on both fields.

7. The method of measuring an unknown electrostatic field with two field sensitive elements comprising periodically exposing one sensitive element to the unknown field to generate a periodic electrical signal, synchronously exposing the other sensitive element to another and known field periodically to generate another periodic electrical signal, combining the signals, and amplifying and indicating the combined signals.

8. In a device for measuring a field potential, in combination, fixed coupled electrodes, one of which is exposable to an unknown field, movable shielding electrodes synchronously positionable in and out of shielding position with respect to the fixed electrodes, amplifying and indicating means to indicate the magnitude of electrical signals obtained from the fixed electrodes, and a control electrode adjacent another fixed electrode for setting up a field in opposition to the unknown field.

ROSS GUNN.

REFERENCES CITED

The following references are of record in the file of this patent:

UNITED STATES PATENTS

| Number | Name | Date |
| --- | --- | --- |
| 1,919,215 | Gunn | July 25, 1933 |
| 2,284,476 | MacKay | May 26, 1942 |
| 2,420,580 | Antes | May 13, 1947 |

FOREIGN PATENTS

| Number | Country | Date |
| --- | --- | --- |
| 283,700 | Great Britain | Jan. 19, 1928 |
| 284,395 | Great Britain | Jan. 26, 1928 |